US009418588B2

(12) United States Patent
Ryu et al.

(10) Patent No.: US 9,418,588 B2
(45) Date of Patent: Aug. 16, 2016

(54) FLAT PANEL DISPLAY DEVICE AND METHOD TO CONTROL THE SAME

(71) Applicant: Samsung Display Co., Ltd., Yongin (KR)

(72) Inventors: Do-Hyung Ryu, Yongin (KR); Hae-Goo Jung, Yongin (KR); Tae-Seok Jang, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 422 days.

(21) Appl. No.: 14/066,419

(22) Filed: Oct. 29, 2013

(65) Prior Publication Data

US 2014/0368529 A1 Dec. 18, 2014

(30) Foreign Application Priority Data

Jun. 13, 2013 (KR) ........................ 10-2013-0067941

(51) Int. Cl.
*G09G 3/32* (2016.01)
*G06T 11/00* (2006.01)

(52) U.S. Cl.
CPC ............ *G09G 3/32* (2013.01); *G09G 2300/046* (2013.01)

(58) Field of Classification Search
None
See application file for complete search history.

(56) References Cited

U.S. PATENT DOCUMENTS

| | | | | |
|---|---|---|---|---|
| 8,193,017 | B2 | 6/2012 | Kim et al. | |
| 8,274,090 | B2 | 9/2012 | Choi et al. | |
| 8,357,938 | B2 | 1/2013 | Yoon et al. | |
| 8,587,499 | B2 | 11/2013 | Kang et al. | |
| 2004/0212731 | A1* | 10/2004 | Sie | H04N 7/0122 348/445 |
| 2009/0021496 | A1* | 1/2009 | Silzars | G09F 13/22 345/204 |
| 2009/0236981 | A1 | 9/2009 | Chang et al. | |
| 2009/0244413 | A1* | 10/2009 | Ishikawa | G02F 1/13718 349/12 |
| 2011/0249211 | A1 | 10/2011 | Song et al. | |
| 2011/0261255 | A1* | 10/2011 | Nagata | G09G 5/005 348/441 |
| 2011/0272675 | A1* | 11/2011 | Chung | H01L 51/5221 257/40 |
| 2012/0081603 | A1* | 4/2012 | Fukaya | G06F 17/30899 348/445 |
| 2012/0268696 | A1 | 10/2012 | Yim et al. | |
| 2013/0070164 | A1* | 3/2013 | Ozaki | G06F 3/0482 348/739 |
| 2015/0015456 | A1* | 1/2015 | Uchida | G09F 9/30 345/1.3 |

FOREIGN PATENT DOCUMENTS

| | | |
|---|---|---|
| JP | 2000-331779 | 11/2000 |
| JP | 2008-112112 | 5/2008 |
| KR | 10-1994-0024481 | 11/1994 |
| KR | 10-2009-0099744 | 9/2009 |
| KR | 10-2011-0110590 | 10/2011 |
| KR | 10-1107178 | 1/2012 |
| KR | 10-2012-0120705 | 11/2012 |

* cited by examiner

*Primary Examiner* — James A Thompson
(74) *Attorney, Agent, or Firm* — H.C. Park & Associates, PLC

(57) ABSTRACT

A flat panel display device includes: a first display unit, a second display unit, and a third display unit. The first display unit comprises a (1-1)-th surface facing a (1-2)-th surface, and is configured to display an image on the (1-1)-th surface and enable external light to transmit from the (1-2)-th surface to the (1-1)-th surface. The second display unit comprises a (2-1)-th surface facing a (2-2)-th surface, and is configured to display an image on the (2-1)-th surface and enable external light to transmit from the (2-2)-th surface to the (2-1)-th surface. The third display unit comprises a (3-1)-th surface facing a (3-2)-th surface, and is configured to display an image on the (3-1)-th surface. The third display unit is disposed between the first display unit and the second display unit.

19 Claims, 5 Drawing Sheets

FLAT PANEL DISPLAY DEVICE AND METHOD TO CONTROL THE SAME

CROSS-REFERENCE TO RELATED APPLICATION

This application claims priority from and the benefit of Korean Patent Application No. 10-2013-0067941, filed on Jun. 13, 2013, which is incorporated by reference for all purposes as if set forth herein.

BACKGROUND

1. Field

Exemplary embodiments relate to display technology, and, more particularly, to flat panel display devices.

2. Discussion

Flat panel display devices, including organic light-emitting display devices, are typically used in an assortment of electronic devices, such as, for example, consumer appliances, mobile phones, monitors, notebook computers, signs, tablets, televisions, etc.

Organic light-emitting display devices, in particular, may be configured as transparent display devices by making thin film transistors (TFTs) or organic light-emitting diodes (OLEDs) of the organic light-emitting display devices in transparent form or by separating an emission region and an external light transmitting region from each other. It is noted, however, that conventional transparent flat panel display devices typically only use one aspect ratio, and, therefore, the entire screen is typically transparent or opaque. In addition, as a non-active region, such as a bezel, exists in traditional flat panel display devices, a user of such flat panel display devices may not sense the full effect of a transparent display device, even if a display region is in a transparent state.

The above information disclosed in this Background section is only for enhancement of understanding of the background of the invention, and, therefore, it may contain information that does not form the prior art that is already known in this country to a person of ordinary skill in the art.

SUMMARY

Exemplary embodiments provide a flat panel display device configured to convert a first aspect ratio into a second aspect ratio, and, in doing so, further configured to cause, at least in part, a non-active, transparent region to either display content or not to display content.

Exemplary embodiments provide a method to control a display device configured to toggle between a first aspect ratio and a second aspect ratio, and, in doing so, control a non-active, transparent region to either display content or not to display content.

Additional aspects will be set forth in the detailed description which follows and, in part, will be apparent from the disclosure, or may be learned by practice of the invention.

According to exemplary embodiments, a flat panel display device includes a first display unit, a second display unit, and a third display unit. The first display unit comprises a (1-1)-th surface facing a (1-2)-th surface, and is configured to display an image on the (1-1)-th surface and enable external light to transmit from the (1-2)-th surface to the (1-1)-th surface. The second display unit comprises a (2-1)-th surface facing a (2-2)-th surface, and is configured to display an image on the (2-1)-th surface and enable external light to transmit from the (2-2)-th surface to the (2-1)-th surface. The third display unit comprises a (3-1)-th surface facing a (3-2)-th surface, and is configured to display an image on the (3-1)-th surface. The third display unit is disposed between the first and second display units.

According to exemplary embodiments, a flat panel display device includes a display unit and a pad unit. The display unit is configured to selectively convert between a first aspect ratio and a second aspect ratio that is larger than the first aspect ratio. The pad unit is disposed in association with a part of the display unit and is electrically connected to the display unit. The display unit is configured to enable external light to transmit through a first region where the first and second aspect ratios do not overlap. The pad unit is disposed in a second region where the first and second aspect ratios overlap.

According to exemplary embodiments, a method includes: causing, at least in part, first content to be displayed using a first display portion of a display device, the first content being displayed in accordance with a first aspect ratio; receiving a command to switch from the first aspect ratio to a second aspect ratio; and causing, at least in part, second content to be displayed using the first display portion and a second display portion of the display device, the second contend being display in accordance with the second aspect ratio, wherein the second display portion is configured to enable external light to propagate therethrough.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
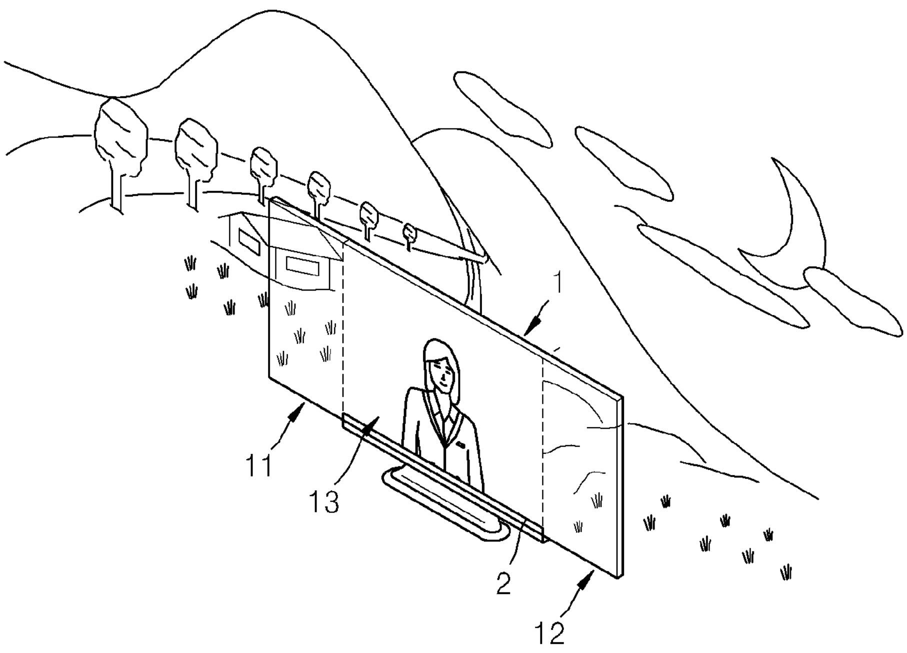
FIG. 1 is a schematic perspective view of a flat panel display device according, to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a schematic perspective view of a flat panel display device, according to exemplary embodiments.

The flat panel display device illustrated in FIG. 1 includes a display unit 1 and a pad unit 2. Although specific reference will be made to this particular implementation, it is also contemplated that flat panel display device may embody many forms and include multiple and/or alternative components. For example, it is contemplated that the components of the flat panel display device may be combined, located in separate structures, and/or separate locations.

According to exemplary embodiments, the display unit 1 includes first, second, and third display units 11, 12, and 13. In this manner, the pad unit 2 is positioned adjacent to the display unit 1 and is electrically connected to the display unit 1.

Although not illustrated, the flat panel display device may also include at least one control unit configured to control the flat panel display device in accordance with one or more of the features and/or processes described herein. The control unit and/or one or more components thereof may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to exemplary embodiments, the features and/or processes described herein may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. In this manner, the flat panel display device may also include or otherwise be associated with one or more memories (not shown) including code (e.g., instructions) configured to cause the display device to perform one or more of the features/functions/processes described herein.

The memories may be any medium that participates in providing code/instructions to the one or more software, hardware, and/or firmware for execution. Such memories may take many forms, including but not limited to non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computerreadable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Figure 2:
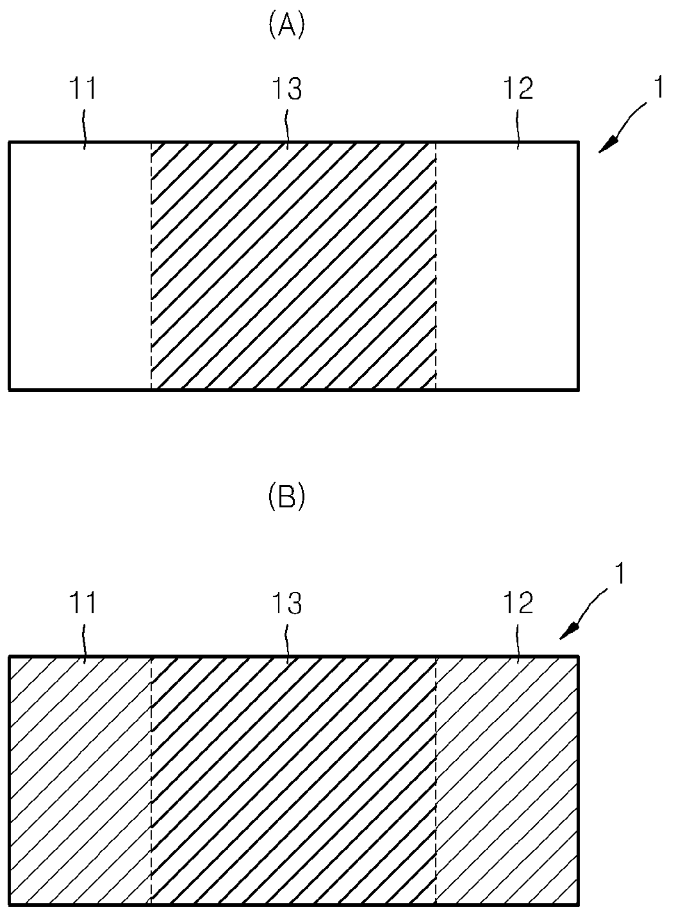
FIGS. 2A and 2B are front views of a display unit of the flat panel display device of FIG. 1, according to exemplary embodiments.
Figure 3:
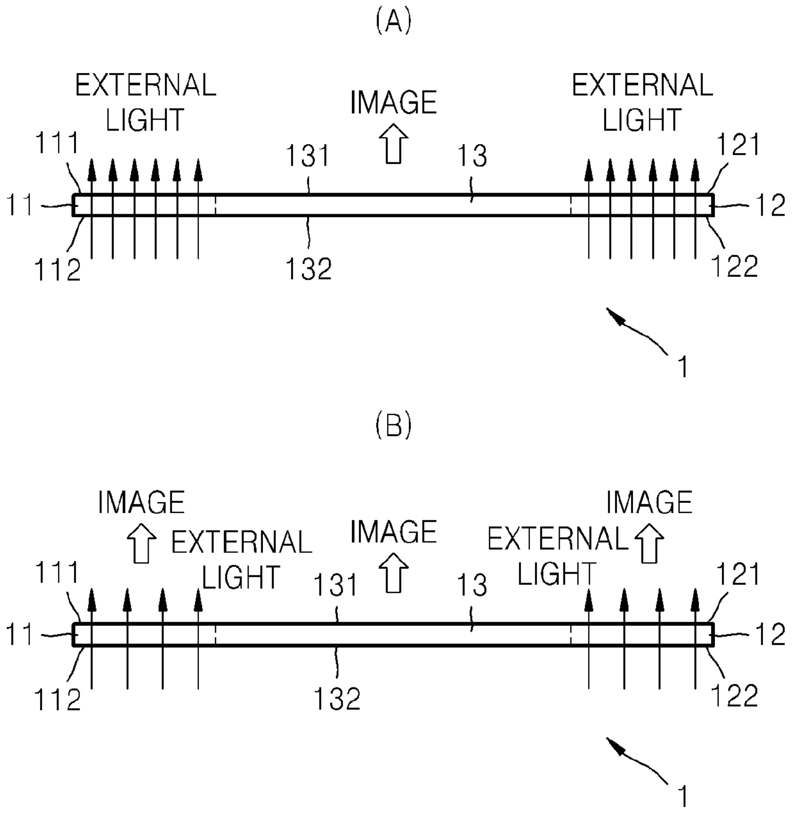
FIGS. 3A and 3B are cross-sectional views of the display unit of the flat panel display device of FIG. 1, according to exemplary embodiments.

FIGS. 2A and 2B are respective front views of the display unit 1 of the flat panel display device of FIG. 1, according to exemplary embodiments. FIGS. 3A and 3B are respective cross-sectional views of the display unit 1 of the flat panel display device of FIG. 1, according to exemplary embodiments. It is generally noted that FIGS. 2A and 3A illustrate the display unit 1 presenting an image only on the third display unit 13, whereas FIGS. 2B and 3B illustrate the display unit 1 presenting an image on the first, second, and third display units 11, 12, and 13.

As illustrated in FIGS. 2A and 3A, when an image is displayed only via the third display unit 13, the display unit 1 is configured in association with a first aspect ratio. The first aspect ratio may be a ratio of a first dimension (e.g., width) of an image with respect to a second dimension (e.g., height) of the image, such as 15:9, 16:9, 16:10, 4:3, etc.

As illustrated in FIGS. 2B and 3B, when an image is displayed (e.g., simultaneously displayed) via the first, second, and third display units 11, 12, and 13, the display unit 1 is configured in association with a second aspect ratio that is larger than the first aspect ratio. The second aspect ratio may be a ratio of the first dimension of an image with respect to a second dimension of the image, such as 21:9, 15:9, 16:9, 16:10, etc.

According to exemplary embodiments, the first aspect ratio and the second aspect ratio may have a shape in which the respective second dimensions (e.g., heights) of the corresponding images are the same and their first dimensions (e.g., widths) are different. To this end, the display unit 1 is provided so that the first aspect ratio and the second aspect ratio may be selectively converted into other aspect ratios. For example, if the first aspect ratio is 16:9, the second aspect ratio may be 21:9. In other words, the display unit 1 is configured to respond to commands to toggle between various aspect ratios, which may be established by a manufacturer of the display unit 1, a user of the display unit 1, a content provider providing content to the display unit 1, etc.

In exemplary embodiments, the third display unit 13 may be a region in which the first aspect ratio and the second aspect ratio overlap each other. The first display unit 11 and the second display unit 12 may be a region in which the first aspect ratio and the second aspect ratio do not overlap each other. As such, the third display unit 13 may be positioned between the first display unit 11 and the second display unit 12, and, thereby, constitute a central screen (or presentation area) of the display unit 1. To this end, the first display unit 11 and the second display unit 12 may be disposed at the respective lateral sides of the third display unit 13, e.g., the right and left sides of the display unit 1.

As illustrated in FIGS. 3A and 3B, the first display unit 11 may include a (1-1)-th surface 111 and a (1-2)-th surface 112 that face each other. An image may be displayed on the (1-1)-th surface 111. The first display unit 11 may be provided so that external light may transmit from the (1-2)-th surface 112 to the (1-1)-th surface 111. To this end, the second display unit 12 may have a (2-1)-th surface 121 and a (2-2)-th surface 122 that face each other. An image may be displayed on the (2-1)-th surface 121. The second display unit 12 may be provided so that external light may transmit from the (2-2)-th surface 122 to the (2-1)-th surface 121. Further, the third display unit 13 may have a (3-1)-th surface 131 and a (3-2)-th surface 132. An image may be displayed on the (3-1)-th surface 131.

According to exemplary embodiments, the first, second, and third display units 11, 12, and 13 may constitute a single flat display panel. In this manner, the (1-1)-th surface 111, the (2-1)-th surface 121, and the (3-1)-th surface 131 may constitute a flat plane surface of the display unit 1. It is also contemplated that the (1-2)-th surface 112, the (2-2)-th surface 122, and the (3-2)-th surface 132 may constitute a flat plane.

In exemplary embodiments, the third display unit 13 may be provided so that external light is unable to transmit through the third display unit 13, such that an image may only be displayed on the third display unit 13. To this end, when the display unit 1 displays an image according to the first aspect ratio, as illustrated in FIGS. 2A and 3A, an image may be displayed on the third display unit 13, and no image is displayed on the first display unit 11 and the second display unit 12. As such, external light may transmit through the first display unit 11 and the second display unit 12 so that an object disposed at an opposite side to a side where an observer is disposed can be recognized by the observer through the first display unit 11 and/or the second display unit 12.

When the display unit 1 displays an image according to the second aspect ratio, as illustrated in FIGS. 2B and 3B, the first, second, and third display units 11, 12, and 13 may display (e.g., simultaneously display) an image. In this manner, since external light can transmit through the first display unit 11 and the second display unit 12, the object positioned at the opposite side to the side where the observer is disposed can be slightly recognized by the observer through the first display unit 11 and/or the second display unit 12. In other words, presentation of respective portions of the image via the first and second display units 11 and 12 may cause, at least in part, the display units 11 and 12 to appear translucent.

Figure 4:
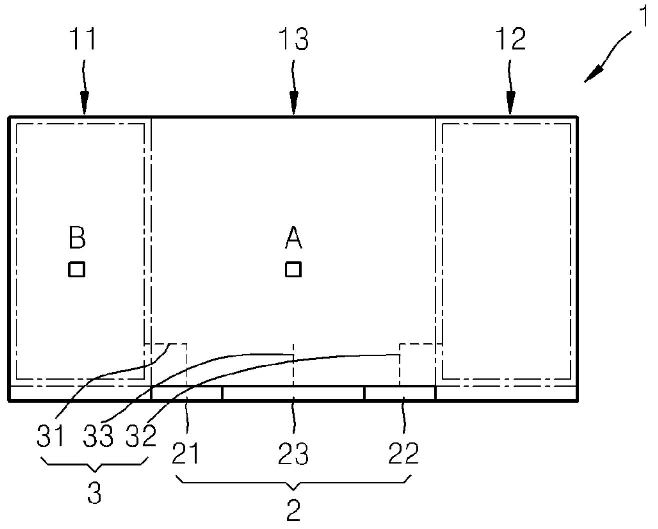
FIG. 4 is a front view of the flat panel display device of FIG. 1, according to exemplary embodiments.

FIG. 4 is a front view of the flat panel display device of FIG. 1, according to exemplary embodiments.

As illustrated in FIG. 4, the pad unit 2 may include a first pad unit 21 that is electrically connected to the first display unit 11, a second pad unit 22 that is electrically connected to the second display unit 12, and a third pad unit 23 that is electrically connected to the third display unit 13. In this manner, each of the first, second, and third pad units 21, 22, and 23 may be positioned in association with respective regions of the third display unit 13. In other words, the first and second pad units 21 and 22 may be respectively positioned adjacent to the first and second display units 11 and 12, which are configured to allow external light to transmit through. As such, the first display unit 11 and the second display unit 12, which are configured to allow external light to transmit through, but are capable of forming respective transparent display units, may constitute fully transparent structures in which an outer panel portion corresponding to a non-active region (e.g., bezel portion) is transparent.

The display unit 1 and the pad unit 2 may be electrically connected to each other via a wiring unit 3. In this manner, the wiring unit 3 may be arranged to pass through a region of the third display unit 13, e.g., a region in which the first aspect ratio and the second aspect ratio overlap each other.

According to exemplary embodiments, the wiring unit 3 may include: a first wiring unit 31 that electrically connects the first display unit 1 and the first pad unit 21; a second wiring unit 32 that electrically connects the second display unit 12 and the second pad unit 22; and a third wiring unit 33 that electrically connects the third display unit 13 and the third pad unit 23. In this manner, at least one of the first, second, and third wiring units 31, 32, and 33, for instance, at least one of the first wiring unit 31 and the second wiring unit 32, may be arranged to pass through the region of the third display unit 13. Each of the first wiring unit 31 and the second wiring unit 32 may be arranged to pass through the region of the third display unit 13 so that none of the wiring units 31, 33, and 33 extends into the first display unit 11 and the second display unit 12, which are configured to enable external light to be transmit therethrough and that are configured to selectively form transparent display units.

Figure 5:
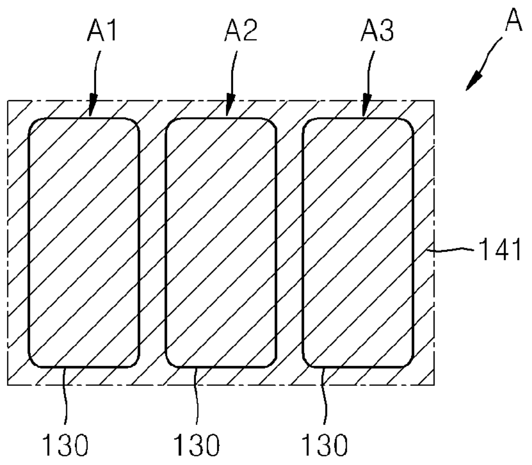
FIG. 5 is a partial enlarged view of pixel A of FIG. 4, according to exemplary embodiments.

FIG. 5 is a partial enlarged view of a pixel A of the third display unit 13 of FIG. 4, according to exemplary embodiments.

As illustrated in FIG. 5, pixel A of the third display unit 13 may include a plurality of subpixels that emit light of different colors. For example, pixel A of the third display unit 13 may include a (1-1)-th subpixel A1, a (1-2)-th subpixel A2, and a (1-3)-th subpixel A3. The (1-1)-th subpixel A1, the (1-2)-th subpixel A2, and the (1-3)-th subpixel A3 may emit different colors of light, such as, for example, red light, green light, and blue light, respectively. Although only three subpixels are illustrated, it is contemplated that pixel A may include any suitable number of subpixels, which may be disposed in any suitable fashion. To this end, the various subpixels of pixel A may be configured to emit any suitable color of light, which may be different or the same as one or more of the other subpixels of pixel A.

As seen in FIG. 5, first subpixel electrodes 130 are respectively disposed in association with the (1-1)-th subpixel A1, the (1-2)-th subpixel A2, and the (1-3)-th subpixel A3. A first facing electrode 141 may be formed to face the first subpixel electrodes 130. For example, the first facing electrode 141 may be disposed on (or under) the (1-1)-th subpixel A1, the (1-2)-th subpixel A2, and the (1-3)-th subpixel A3. As such, the first facing electrode 141 may be formed to cover each of the (1-1)-th subpixel A1, the (1-2)-th subpixel A2, and the (1-3)-th subpixel A3. To this end, the first facing electrode 141 may be formed as a common electrode covering the entire (or a relatively substantial portion of) the third display unit 13 when viewed as in FIG. 4. Although not shown, organic emission layers configured to emit light of different colors may be disposed between the first facing electrode 141 and the first subpixel electrodes 130 so that each subpixel includes an organic light-emitting diode (OLED). Each first subpixel electrode 130 may be electrically connected to a pixel circuit unit (not illustrated) configured to drive the pixel.

According to exemplary embodiments, when the third display unit 13 includes a rear emission type structure, the first subpixel electrodes 130 may be transparent and/or semitransparent electrodes through which light transmits, and may be formed from or include aluminum zinc oxide (AZO), gallium zinc oxide (GZO), indium tin oxide (ITO), indium zinc oxide (IZO), zinc oxide (ZnO), indium (III) oxide ($In_2O_3$), etc. It is also contemplated that one or more conductive polymers (ICP) may be utilized, such as, for example, polyaniline, poly(3,4-ethylenedioxythiophene)poly(styrenesulfonate) (PEDOT:PSS), etc. Further, the first facing electrode 141 may include silver (Ag), magnesium (Mg), aluminum (Al), platinum (Pt), palladium (Pd), gold (Au), nickel (Ni), neodymium (Nd), indium (Ir), chromium (Cr), lithium (Li), calcium (Ca), ytterbium (Yb), etc., from which light may be reflected, or a compound thereof.

In exemplary embodiments, when the third display unit 13 includes a front emission type structure, the first subpixel electrodes 130 may include Ag, Mg, Al, Pt, Pd, Au, Ni, Nd, Ir, Cr, Li, Ca, Yb, etc., from which light may be reflected, or a compound thereof. Further, the first facing electrode 141 may include AZO, GZO, ITO, IZO, ZnO, $In_2O_3$, etc., or one or more ICPs, etc., through which light may transmit.

Figure 6:
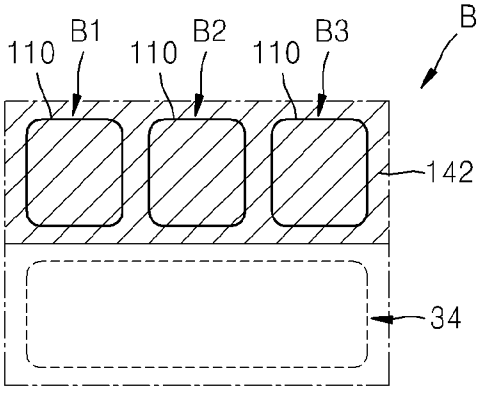
FIG. 6 is a partial enlarged view of pixel B of FIG. 4, according to exemplary embodiments.

FIG. 6 is a partial enlarged view of pixel B of the first display unit 11 of FIG. 4, according to exemplary embodiments.

As illustrated in FIG. 6, pixel B of the first display unit 11 may include a plurality of subpixels that emit light of different colors. For example, pixel B of the first display unit 11 may include a (2-1)-th subpixel B1, a (2-2)-th subpixel B2, and a (2-3)-th subpixel B3. The (2-1)-th subpixel B1, the (2-2)-th subpixel B2, and the (2-3)-th subpixel B3 may emit different colors of light, such as, for example, red light, green light, and blue light, respectively. Although only three subpixels are illustrated, it is contemplated that pixel B may include any suitable number of subpixels, which may be disposed in any suitable fashion. To this end, the various subpixels of pixel B may be configured to emit any suitable color of light, which may be different or the same as one or more of the other subpixels of pixel B. Furthermore, pixel B may also include a transmitting region 34 through which external light transmits. Although only one transmitting region is shown, it is contemplated that pixel B may include any suitable number of transmitting regions, which may be disposed in any suitable fashion.

As seen in FIG. 6, second subpixel electrodes 110 may be respectively disposed in association with the (2-1)-th subpixel B1, the (2-2)-th subpixel B2, and the (2-3)-th subpixel B3. A second facing electrode 142 may be formed to face the second subpixel electrodes 110. For example, the second facing electrode 142 may be disposed on (or under) the (2-1)-th subpixel B1, the (2-2)-th subpixel B2, and the (2-3)-th subpixel B3.

Although not shown, organic emission layers configured to emit light of different colors may be disposed between the second facing electrode 142 and the second subpixel electrodes 110 so that each subpixel includes an OLED. Each second subpixel electrode 110 may be electrically connected to a pixel circuit unit (not illustrated) configured to drive the pixel.

According to exemplary embodiments, the second facing electrode 142 may be formed to cover each of the second subpixel electrodes 110, but may not be formed in the transmitting region B4. To this end, the second facing electrode 142 may be electrically connected to the first facing electrode 141 described above, and may be formed integrally therewith.

According to exemplary embodiments, when the first display unit 11 includes a rear emission type structure, the second subpixel electrodes 110 may be transparent and/or semitransparent electrodes through which light may transmit, and may be formed from or include AZO, GZO, ITO, IZO, ZnO, $In_2O_3$, etc. It is also contemplated that one or more ICPs may be utilized. Further, the second facing electrode 142 may include Ag, Mg, Al, Pt, Pd, Au, Ni, Nd, Ir, Cr, Li, Ca, Yb, etc., from which light may be reflected, or a compound thereof.

In exemplary embodiments, when the first display unit 11 includes a front emission type structure, the second subpixel electrodes 110 may include Ag, Mg, Al, Pt, Pd, Au, Ni, Nd, Ir, Cr, Li, Ca, Yb, etc., from which light may be reflected, or a compound thereof. Further, the second facing electrode 142 may include AZO, GZO, ITO, IZO, ZnO, $In_2O_3$, etc., or one or more ICPs, etc., through which light may transmit.

According to exemplary embodiments, one or more of the pixel structures disclosed in Korean Patent No. 10-1107178, U.S. Pat. No. 8,193,017, U.S. Pat. No. 8,274,090, and/or U.S. Pat. No. 8,357,938, each of which is incorporated, by reference, for all purposes, as if fully set forth herein, may be implemented as a pixel structure of the first display unit 11. It is contemplated, however, that any other suitable pixel structure through which external light transmits and a transparent (or otherwise see-through) display device may be implemented, may be implemented as the pixel structure of the first display unit 11.

According to exemplary embodiments, the first display unit 11 and the second display unit 12, which include an external light-transmitting region, have a fully transparent (or translucent) structure in a non-active region, such that, when an image is displayed only on the third display unit 13, an observer may see a panel having a decreased size, and, as such, can more readily sense the effect of a reduced aspect ratio.

Figure 7:
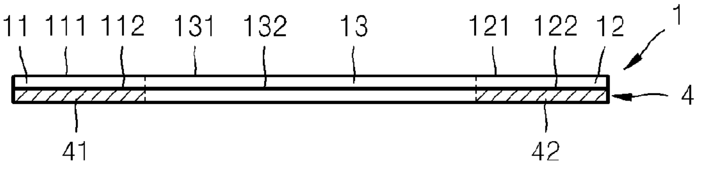
FIG. 7 is a cross-sectional view of a display unit of a flat panel display device, according to exemplary embodiments.
Figure 8:
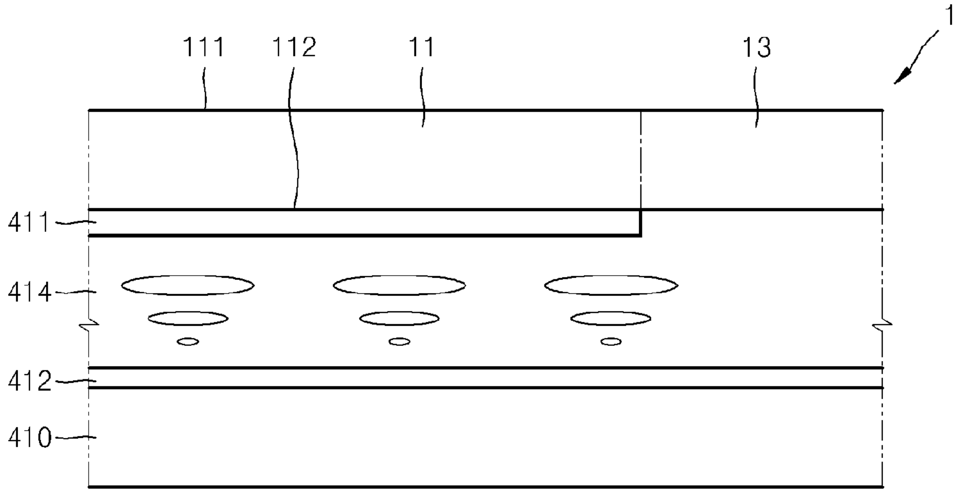
FIG. 8 is a partial enlarged view of FIG. 7, according to exemplary embodiments.

FIG. 7 is a cross-sectional view of a display unit of a flat panel display device, according to exemplary embodiments. FIG. 8 is a partial enlarged view of FIG. 7. The flat panel display device illustrated in FIGS. 7 and 8 further includes a blocking unit 4 configured to selectively block external light from transmitting through one or more of the first and second display units 11 and 12. It is noted, however, that the remainder of the flat panel display device of FIGS. 7 and 8 may be substantially similar to the flat panel display of FIGS. 3A and 3B. As such, to avoid obscuring exemplary embodiments described herein, differences are explained in more detail below.

As seen in FIG. 7, the blocking unit 4 is positioned to face the display unit 1. That is, the blocking unit 4 is positioned to correspond to at least a region in which the first aspect ratio and the second aspect ratio do not overlap each other. In this manner, the blocking unit 4 may be utilized to selectively block external light from transmitting through corresponding regions of the first display unit 11 and the second display unit 12.

In exemplary embodiments, the blocking unit 4 may include a first blocking unit 41 and a second blocking unit 42. The first blocking unit 41 may be positioned in association with the (1-2)-th surface 112 of the first display unit 11. As such, the first blocking unit 41 may be configured to selectively block external light from transmitting through the first display unit 11. The second blocking unit 42 may be positioned in association with the (2-2)-th surface 122 of the second display unit 12. As such, the second blocking unit 42 may be configured to selectively block external light from transmitting through the second display unit 12.

According to exemplary embodiments, the first blocking unit 41 and the second blocking unit 42 may be a type of blocking unit that may selectively block external light from transmitting through the first display unit 11 and the second display unit 12. To this end, the first blocking unit 41 and the second blocking unit 42 may have substantially the same configuration, but alternatively disposed with respect to the first display unit 11 and the second display unit 12. As such, only the configuration of the first blocking unit 11 is described below, however, this description also relates to the second blocking unit 12.

As an example of the configuration of the first blocking unit 11, the display device of FIGS. 7 and 8 may include a first electrode 411, which is formed in a region corresponding to the first display unit 11, and a second electrode 412, which is formed in a region corresponding to the first display unit 11 and the third display unit 13 as a common electrode, may be disposed facing each other. A light shielding material layer 414 may be disposed between the first electrode 411 and the second electrode 412, such as illustrated in FIG. 8. In this manner, the light shielding material layer 414 may be controlled to implement the first blocking unit 41. That is, the light shielding material layer 414 may be selectively activated to prevent external light from transmitting therethrough.

In exemplary embodiments, the first electrode 411 may be formed on the (1-2)-th surface 112, the second electrode 412 may be formed on an additional substrate 410, and the first electrode 411 and the second electrode 412 may be coupled to each other, such that the light shielding material layer 414 is disposed therebetween. It is contemplated, however, that the first light blocking unit 41 may be formed in any other suitable manner. For instance, the first blocking unit 41 may be additionally formed and may be bonded to the (1-2)-th surface 112 of the first display unit 11. Liquid crystal may be used as the light shielding material layer 414. As such, the liquid crystal may be dispersed in a polymer matrix. An electric discoloration material that is transparent when electricity is not applied to the electric discoloration material and that becomes opaque when electricity is applied to the electric discoloration material may be used. When a common voltage (or power) is applied to the second electrode 412, and voltage (or power) is applied to the first electrode 411, the first display unit 11 may become selectively opaque in accordance with an electric field being generated in the light shielding material layer 414.

According to exemplary embodiments, the first display unit 11 and the second display unit 12 may be controlled to become selectively opaque. As such, in a mode in which the first, second, and third display units 13 display an image, such as display an image simultaneously, if the first display unit 11 and the second display unit 12 are made opaque, the visibility of the image displayed on the first, second, and third display units 11, 12, and 13 may be further improved. Furthermore, when the third display unit 13 is also provided as a transparent display unit, the blocking unit 4 may be configured in association with a region corresponding to the third display unit 13, as well as in respective regions corresponding to the first and second display units 11 and 12.

According to exemplary embodiments, a flat panel display device may be configured to convert a first aspect ratio into a second aspect ratio, and a portion through which external light transmits and is capable of forming a transparent display unit, may constitute portions of a fully transparent structure in which an outer panel portion corresponding to a non-active region is also transparent. When an image is displayed according to a relatively small aspect ratio, an observer may observe a panel having a decreased size, and, as such, may better perceive an effect in which an aspect ratio is reduced due to the transparency of portion in which the image is not displayed. To this end, a transparent portion of the flat panel display device may be configured to become selectively opaque so that the visibility of an image may be further improved when the aspect ratio is converted into a relatively large aspect ratio, as compared to the relatively small aspect ratio.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A flat panel display device, comprising:

a first display portion comprising a (1-1)-th surface facing a (1-2)-th surface, the first display portion being configured to display an image on the (1-1)-th surface and enable external light to transmit from the (1-2)-th surface to the (1-1)-th surface;

a second display portion comprising a (2-1)-th surface facing a (2-2)-th surface, the second display portion being configured to display an image on the (2-1)-th surface and enable external light to transmit from the (2-2)-th surface to the (2-1)-th surface; and a third display portion comprising a (3-1)-th surface facing a (3-2)-th surface, the third display portion being configured to display an image on the (3-1)-th surface, wherein the third display portion is disposed between the first and second display portions, wherein the flat panel display device is configured to selectively display a first content in accordance with a first aspect ratio or a second content in accordance with a second aspect ratio, and wherein the first content is caused, at least in part, to be displayed via the third display portion in accordance with the first aspect ratio, and the second content is caused, at least in part, to be displayed across the first, second, and third display portions in accordance with the second aspect ratio.

2. The flat panel display device of claim 1, wherein:

the (1-1)-th surface, the (2-1)-th surface, and the (3-1)-th surface define a substantially flat plane; or the (1-2)-th surface, the (2-2)-th surface, and the (3-2)-th surface define a substantially flat plane.

3. The flat panel display device of claim 1, wherein the third display portion is configured to prevent external light from transmitting therethrough.

4. The flat panel display device of claim 1, further comprising:

a first pad unit electrically connected to the first display portion;

a second pad unit electrically connected to the second display portion; and a third pad unit electrically connected to the third display portion, wherein each of the first, second, and third pad units are disposed in association with the third display portion.

5. The flat panel display device of claim 4, further comprising:

a first wiring unit electrically connected to the first display portion and the first pad unit; and a second wiring unit electrically connected to the second display portion and the second pad unit, wherein at least one of the first wiring unit and the second wiring unit passes through the third display portion.

6. The flat panel display device of claim 4, wherein the first pad unit is not disposed in association with the first display portion and the second display portion.

7. The flat panel display device of claim 4, wherein the second pad unit is not disposed in association with the first display portion and the second display portion.

8. The flat panel display device of claim 1, further comprising:

a first blocking unit disposed in association with the (1-2)-th surface of the first display portion, wherein the first blocking unit is configured to selectively block external light from transmitting through the first display portion.

9. The flat panel display device of claim 1, further comprising:

a second blocking unit disposed in association with the (2-2)-th surface of the second display portion, wherein the second blocking unit is configured to selectively block external light from transmitting through the second display portion.

10. The flat panel display device of claim 1, wherein:

the flat panel display device is configured to have an aspect ratio of 16:9 when only the third display portion is utilized to display the image; and the flat panel display device is configured to have an aspect ratio of 21:9 when the first, second, and third display portions are utilized to display the image.

11. A flat panel display device, comprising:

a display unit configured to selectively convert between a first aspect ratio and a second aspect ratio that is larger than the first aspect ratio; and a pad unit disposed in association with a part of the display unit and electrically connected to the display unit, wherein the display unit is configured to enable external light to transmit through a first region where the first and second aspect ratios do not overlap, and wherein the pad unit is disposed in a second region where the first and second aspect ratios overlap.

12. The flat panel display device of claim 11, wherein the display unit is configured to prevent external light from being transmitted through the second region.

13. The flat panel display device of claim 11, wherein the pad unit is not disposed in association with the first region.

14. The flat panel display device of claim 11, further comprising:

a wiring unit electrically connecting the display unit and the pad unit, wherein the wiring unit passes through the second region.

15. The flat panel display device of claim 11, further comprising:

a blocking unit facing the display unit, wherein the blocking unit is disposed in association with the first region, and wherein the blocking unit is configured to selectively block external light from transmitting through the first region.

16. A method, comprising:

causing, at least in part, first content to be displayed using a first display portion of a display device, the first content being displayed in accordance with a first aspect ratio;

receiving a command to switch from the first aspect ratio to a second aspect ratio; and causing, at least in part, second content to be displayed using the first display portion, a second display portion, and a third display portion of the display device, the second content being displayed in accordance with the second aspect ratio across the first display portion, the second display portion, and the third display portion, wherein the second display portion and the third display portion are configured to enable external light to propagate therethrough.

17. The method of claim 16, wherein the first display portion is configured to either prevent external light from propagating therethrough or selectively enable external light to propagate therethrough.

18. The method of claim 16, wherein the second aspect ratio is larger than the first aspect ratio.

19. A method, comprising:

causing, at least in part, first content to be displayed using a first display portion of a display device, the first content being displayed in accordance with a first aspect ratio;

receiving a command to switch from the first aspect ratio to a second aspect ratio; and causing, at least in part, second content to be displayed using the first display portion and a second display portion of the display device, the second content being displayed in accordance with the second aspect ratio, wherein the second display portion is configured to enable external light to propagate therethrough, and the second display portion is configured to become selectively opaque, and wherein the method further comprises causing, at least in part, the second display portion to become opaque in response to receiving the command to switch from the first aspect ratio to the second aspect ratio.

* * * * *